United States Patent

Hahn

Patent Number: 4,496,408

Date of Patent: Jan. 29, 1985

[54] METHOD FOR PRODUCING BIAXIALLY ORIENTED HOLLOW ARTICLES

[75] Inventor: Granville J. Hahn, Big Spring, Tex.

[73] Assignee: Cosden Technology, Inc., Dallas, Tex.

[21] Appl. No.: 479,624

[22] Filed: Mar. 28, 1983

Related U.S. Application Data

[63] Continuation of Ser. No. 299,612, Sep. 4, 1981, abandoned.

[51] Int. Cl.$^3$ .................... B29C 27/08; B29C 17/04
[52] U.S. Cl. ........................ 156/73.5; 264/68; 264/512; 264/545; 264/549; 264/551
[58] Field of Search .............. 264/530, 532, 531, 544, 264/545, 549, 550, 551, 512, 68; 156/73.5, 292

[56] References Cited

U.S. PATENT DOCUMENTS

| | | | |
|---|---|---|---|
| 2,891,280 | 6/1959 | Poutis | 264/551 |
| 3,218,379 | 11/1965 | Edwards | 264/549 |
| 3,737,494 | 6/1973 | Wolf | 264/549 |
| 3,814,784 | 6/1974 | Wolf | 264/549 |

*Primary Examiner*—Jan Silbaugh
*Attorney, Agent, or Firm*—Schwartz, Jeffery, Schwaab, Mack, Blumenthal & Koch

[57] ABSTRACT

Disclosed is a process for the production of a hollow article comprised of a biaxially oriented thermoplastic resinous material, comprising the steps of heating a sheet of thermoplastic material to a temperature above the orientation temperature of the thermoplastic material; clamping an area of the heated thermoplastic sheet between a first mold half and a second mold half, the first mold half containing a pre-form mold surface having a configuration predetermined to provide for uniform wall thickness of the hollow article to be formed, the surface being at a temperature which is not higher than the orientation temperature of the thermoplastic material, and the second mold half having a cavity which corresponds to the shape of the hollow article to be produced; forcing the heated thermoplastic sheet by pressure differential into the first mold half against the surface; maintaining the thermoplastic sheet in contact with the surface for a period of time sufficient to bring the thermoplastic sheet to its orientation temperature; and forcing the thermoplastic sheet into the second mold half by means of a pressure differential which is sufficient to cause the thermoplastic sheet to conform with the cavity in the second mold half to form a hollow article with a force sufficient to substantially, molecularly orient the thermoplastic material in both the longitudinal and lateral directions.

20 Claims, 9 Drawing Figures

METHOD FOR PRODUCING BIAXIALLY ORIENTED HOLLOW ARTICLES

This is a continuation of U.S. patent application Ser. No. 299,612 filed Sept. 4, 1981 and now abandoned.

BACKGROUND OF THE INVENTION

The present invention relates to a method for producing hollow articles, and more especially to a method for producing biaxially oriented containers from thermoplastic resinous materials.

It is recognized that the strength properties of thermoformed plastic containers and receptacles are materially enhanced when the thermoplastic materials utilized to produce these articles are molecularly oriented. Such molecular orientation can be provided by the use of pre-oriented stock materials; however, it is more preferred to impart the molecular orientation to the final articles by including appropriate steps in the article-forming method.

The most beneficial strength properties are achieved when the plastic material in the walls of the final article has been biaxially oriented in a uniform or balanced manner, i.e., the material has been oriented by stretching to the same extent in both coordinate axes of the plane of the material and is characterized by very low birefringence values. However, the accomplishment of this balanced biaxial orientation is a complex task within the context of producing a hollow article of varying cross-section by means of a thermoplastic technique.

Numerous proposals have been made for the production of hollow articles from thermoplastic materials which exhibit a certain degree of molecular orientation. These proposals generally involve a series of separate steps, namely, the formation of a pre-form, a preliminary stretching of the pre-form, and finally a pressure molding step to cause the stretched pre-form to conform to the final desired shape.

The step of forming the pre-form, or parison, as it is often called, is typically carried out in either one of two ways. One method is to form a tubular parison by an extrusion process which is then further processed directly from the extrusion process. In another and commercially significant method, the tubular parison is formed by an injection molding process, after which it is cooled, and then the parison is reheated prior to carrying out the subsequent process steps.

Preliminary stretching of the pre-form or parison is typically carried out by physically engaging the parison with a mechanical stretching device, usually a plug assist, and then moving the stretching device axially with respect to the parison, or vice versa. In this type of process, preliminary stretching is usually done while the plastic material is at its orientation temperature, so that significant orientation takes place in the axial or longitudinal direction. The stretched parison is then subjected to the final blowing step while the plastic material is still at its orientation temperature, and in this way, orientation in the lateral direction or radial direction is produced. The following U.S. Pat. Nos. are illustrative of such methods:

3,311,684
3,470,282
3,662,049
3,754,851
3,849,530
3,944,530
3,949,038
4,042,657
4,144,298
4,151,250
4,153,667
4,188,357

In another similar process, the parison is subjected to a preliminary blowing step in order to produce a pre-form blown article having a shape generally the same as the final desired article, but smaller in dimensions. This preliminary blowing step is typically carried out while the polymer material is at a temperature above its orientation temperature. Multiaxial orientation is then achieved when the preform blown article is subjected to the final blowing step, i.e., with the polymer at its orientation temperature. Such a process is described in the following U.S. Pat. Nos.:

3,767,747
3,781,395
Re.29,045
Re.29,065
3,882,213
3,949,034
3,944,642
3,978,184
4,070,428

Other processes apply a separate biaxial orientation step to a film or sheet of thermoplastic material and then subject the oriented sheet to a thermo-forming process, such as vacuum-forming or blow-molding. See, e.g., U.S. Pat. Nos. 4,118,454 and 4,234,536. However, in such processes, the orientation in the polymer sheet is adversely affected during the thermo-forming stage.

Still other specialized processes have been proposed which are intended to produce oriented hollow articles from flat stock material and/or from pre-formed, planar parisons. These processes involve either the formation of a pre-form by means of a mechanical stretching device such as a plug assist, (See, e.g., U.S. Pat. Nos. 3,667,049, 3,737,494, 3,814,784 and 3,966,860), and/or the injection molding or forging of a pre-formed blank (See, e.g., U.S. Pat. Nos. 3,471,896 and 3,739,052). Another process involves feeding two sheets of plastic into a mold at their orientation temperature, sealing the edges and blowing at pressures between about 50 and 150 psig. Some orientation is said to take place during molding, but primary orientation is carried out in separate steps or a pre-oriented material is used.

There exists in the industry a great and long-felt demand for a plastic container which can be used to satisfactorily package carbonated beverages. Such a container must satisfy several strict criteria. It must first of all have sufficient strength to safely withstand the internal pressure coupled with the rough handling conditions to which containers of this type are subjected during bottling and shipping as well as by the ultimate consumer. Furthermore, the container must be capable of maintaining carbonation during periods of prolonged shelf life. In addition, the container must be capable of being mass produced at an efficient rate and from relatively inexpensive materials.

No such product is presently available on the market. Beer and other malt beverages have not yet been packaged in plastic bottles. Soft drinks are beginning to appear in plastic bottles, particularly in the 1 or 2 liter size; however, these bottles, made of polyethylene terephthalate (PET), do not provide shelf life as long as is desired. Most significantly, it is apparent from the foregoing review of the state of the art that none of the heretofore proposed processes is capable of efficiently mass producing such containers at a sufficiently low cost. These processes involve a multitude of separate steps, in each case requiring the transfer of a parison or pre-form from one stage to another, usually in different pieces of apparatus. Furthermore, the apparatus pieces usually have moving parts, such as a plug assist. The process used to produce the commercially available soft drink bottles employs injection molding to produce the parison, and is quite clearly a time- and cost-inefficient process.

Moreover, the prior processes, especially those which injection mold a parison, are obviously limited in the choice of polymeric materials which can be employed to produce the containers. For example, the injection molding of parisons having multiple layer wall configurations is a complex operation. In addition, orientation of multi-layered structures involves many unpredictable factors.

SUMMARY OF THE INVENTION

It is therefore an object of the present invention to provide an improved process for the production of a biaxially oriented hollow article from a thermoplastic resinous material.

It is also an object of the present invention to provide a process for the production of a biaxially oriented hollow article wherein the process proceeds directly from a film- or sheet-form stock material.

Another object of the invention resides in providing such a process which can be carried out efficiently at a very high rate of speed, in order to enable inexpensive mass production of the hollow articles.

A further object of the invention is to provide such a process which enables a wide selection of thermoplastic materials, including readily producible, multiple layer films or sheets of different thermoplastic materials.

It is a particular object of the present invention to provide a process which is designed to produce a plastic bottle adapted for packaging carbonated beverages, including beer and other alcoholic malt beverages.

In accomplishing the foregoing objects, there has been provided in accordance with the present invention a process for the production of a hollow article comprised of a biaxially oriented thermoplastic resinous material, comprising the steps of providing a sheet of a thermoplastic material; heating said sheet of thermoplastic material to a temperature above the orientation temperature of the thermoplastic material; clamping an area of the heated thermoplastic sheet between a first mold half and a second mold half, the first mold half containing a pre-form mold surface having a configuration predetermined to provide for a uniform wall thickness of the hollow article to be formed, the surface being at a temperature which is not higher than the orientation temperature of the thermoplastic material, and the second mold half having a cavity which corresponds to the shape of the hollow article to be produced; forcing the heated thermoplastic sheet by pressure differential into the first mold half against the surface; maintaining the thermoplastic sheet in contact with the surface for a period of time sufficient to bring the thermoplastic sheet to its orientation temperature; and forcing the thermoplastic sheet into the second mold half by means of a pressure differential which is sufficient to cause the thermoplastic sheet to conform with the cavity in the second mold half to form a hollow article with a force sufficient to substantially, molecularly orient the thermoplastic material in both the longitudinal and lateral directions. Preferably, the thermoplastic material is heated to a temperature slightly above its orientation temperature.

In one embodiment of the invention, a plurality of hollow articles are formed simultaneously and at least one of this plurality of hollow articles comprises a container top portion and at least one of the plurality of hollow articles comprises a mating container bottom portion. The process preferably further comprises the step of uniting the container top portion and the container bottom portion to produce a container, preferably by friction welding the container portions together.

Further objects, features and advantages of the present invention will become apparent from the detailed description of preferred embodiments which follows, when considered together with the attached figures of drawing.

DETAILED DESCRIPTION OF PREFERRED EMBODIMENTS

Figure 1:
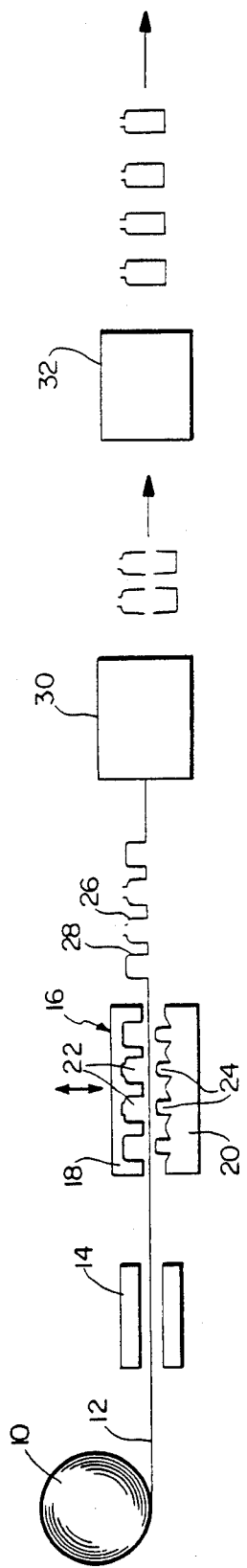
FIG. 1 is a schematic view of an apparatus line which is useful for carrying out the process according to the invention.

The present invention provides a process which is capable of blow molding hollow thermoplastic articles in a single forming-step procedure which are characterized by an optimum degree of biaxial orientation. The process is capable of operating at very short cycle times, which means that the hollow articles can be mass produced at a very high rate of speed and at low cost.

The process of the invention is applicable generally to any type of thermoplastic resinous material which can be extruded into sheet form and can be thermoformed. Both crystalline and amorphous polymers can be employed in the process of the invention. Examples of appropriate types of polymeric materials include the polyesters, such as polyethylene terephthalate; the vinyl aromatic or styrenic polymers, including substituted and unsubstituted styrene polymers and copolymers, high impact polystyrenes comprised of styrenerubbery polymer blends, graft copolymers and block copolymers, and ABS-type resins; polyolefins, such as polyethylene and polypropylene; nitrile-containing resins, such as copolymers containing a major proportion of acrylonitrile; acrylic materials, such as polymers and copolymers of acrylic and methacrylic acid esters; vinyl esters, such as polyvinyl chloride and vinylidene halide polymers; polyamides; and various blends and mixtures of these generally well known classes of polymeric materials.

The thermoplastic characteristics or properties of these classes of polymers are also well known to persons skilled in the art. For each particular polymer, there exists a so-called "orientation temperature range" or "stretch flow range", within which the polymer can be molecularly oriented upon stretching. This range lies somewhere below the melting temperature of a polymer which melts at a specific temperature, or below the crystalline melting range of a polymer which melts over a range of temperatures. The orientation temperature range also lies above the second order glass transition point, which is the temperature at which an essentially amorphous polymer, or a crystallizable polymer which can be quenched as an amorphous polymer, makes a transition from a glassy state to a rubbery state. It is in this rubbery state that the polymer in the form of a film can be oriented by stretching.

For each type polymer, the orientation temperature range will be different; however, it can be easily determined by simple experiments, or in the case of a large number of polymers, it can be looked up in a variety of reference sources. For example, a representative listing of polymer types and their orientation temperature ranges is given in British Pat. No. 921,308, the disclosure of which is hereby incorporated by reference.

The basic process of blow molding is well known in the art for the production of hollow articles; however, this process has not been adapted for the production of biaxially oriented articles. In the introductory portion of the specification there has been described the special procedures used in the art to produce oriented hollow articles. A typical blow molding machine is capable of only very limited operating conditions, such as blowing pressures of up to only about 100 psi or 150 psi. These conventional machines are not suitable for carrying out the process of the present invention without being modified to enable higher blowing pressures and in other ways which will be explained below.

Referring now to the drawings, there is schematically illustrated in FIG. 1 an apparatus line for carrying out the process according to the present invention. The line originates with a source of thermoplastic film or sheet, such as roll 10 of polymeric sheet material 12. This source of sheet material 12 can also comprise an extrusion device for producing the polymer sheet in a continuous operation as the present process is carried out.

The sheet material is then passed through a heater 14 which is suitable for raising the temperature of the polymer material in the sheet to a value which is above its second order glass transition temperature or its softening temperature, but which is lower than the melting temperature or melting range of the polymer.

The heated thermoplastic sheet is next transported into the blow molding apparatus schematically illustrated and identified by the reference numeral 16. The blow molding apparatus is characterized by upper and lower mold sections 18, 20 which are displaceable with respect to one another so as to be capable of opening and closing a plurality of mold cavities 22 formed therebetween. Upon closure of the upper and lower mold sections, the sheet of thermoplastic material is clamped between the two mold sections, and then a pressure differential is established on one or the other side of the plastic sheet, in order to force the sheet into the mold cavities and thereby thermoform it into the desired shape.

Figure 7:
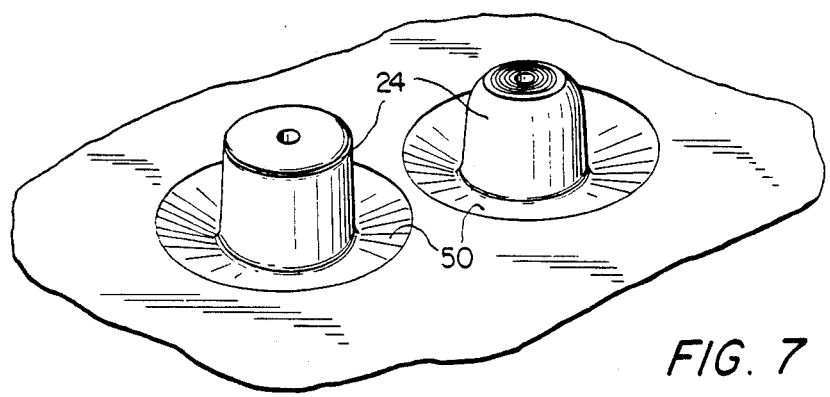
FIG. 7 is a perspective view of a pre-form mold surface useful in the process of the present invention.
Figure 8:
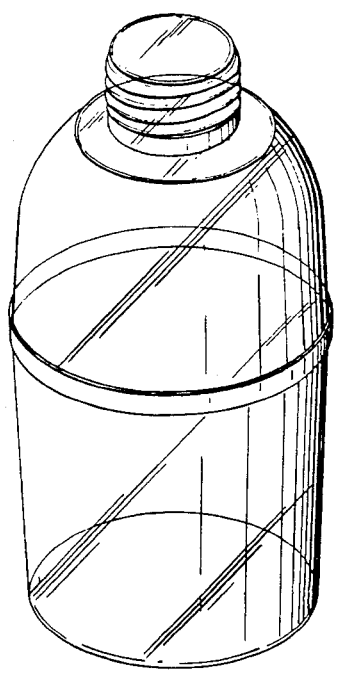
FIG. 8 is a perspective view of a plastic bottle manufactured in accordance with the present invention.

In accordance with the present invention, the blow molding apparatus is provided with a plurality of specially designed cavities 24 in the mold section opposite to the mold section which contains the mold cavities 22. One specially designed cavity 24 is positioned opposite to each mold cavity 22. Each special cavity 24 contains a pre-form mold surface having a predetermined configuration. One particular embodiment of such a pre-form surface, which is well suited for producing hollow, generally cup-shaped articles from polyethylene terephthalate (PET), is illustrated in FIG. 7. The configuration of these surfaces is not critical to the present invention, and surface configurations generally the same as that shown in FIG. 8 can be used satisfactorily for producing hollow articles from other types of thermoplastic materials. A particular shape is imparted to these surfaces in order to optimize the uniformity in the wall thickness of the hollow article after it is blow molded.

The surfaces of pre-form mold portions 24 function primarily as heat exchange surfaces. After being clamped between the mold sections 18, 20, the thermoplastic sheet is blown toward and against the surfaces of pre-form mold portions 24. Upon being permitted to remain in contact with these surfaces for a predetermined period of time, which is dependent, inter alia, upon the temperature at which the surfaces are maintained, the polymer sheet is blown into mold cavities 22 by creating a positive pressure differential on the side of the sheet 12 opposite the mold cavities. After this, the mold sections are opened, and the blow molded sheet is advanced out of the apparatus. The individual stages of the molding step will be explained in more detail below with reference to FIGS. 2–5.

As the sheet exits from the blow molding apparatus 16, it now contains a plurality of hollow, blow molded articles formed therein, which are connected together by non-thermoformed web sections of the sheet 12. The hollow articles may all be of the same shape, or as shown in FIG. 1, a portion of the articles can be of one configuration, e.g., a bottled top portion 26, whereas the remaining hollow articles may have a different configuration, e.g., a bottle bottom portion 28 adapted to be mated with the bottle top portion. This sheet of hollow articles is then introduced into a suitable trimming apparatus 26 wherein the interconnected hollow articles are severed from one another and trimmed of scrap thermoplastic material, which can be recycled, for example, to an extrusion device used to form the thermoplastic sheet 12.

The trimmed hollow articles exiting from the trimming apparatus 30 can be used just as they are, for example, as cups or as containers for food products. As a result of being able to efficiently produce such a container with biaxially oriented walls, it is possible to further reduce the thickness of the container walls without loss of strength properties. Hence, the amount of thermoplastic material used per container can be reduced to yield a savings in material costs.

On the other hand, the hollow articles exiting from the trimming apparatus can be further processed in order to convert them into more sophisticated types of containers. For example, in the embodiment illustrated in FIG. 1 and in more detail in FIG. 6, wherein bottle top and bottom portions are produced in the blow molding stage, the bottle portions can be subsequently joined together to produce integral bottles. This can be accomplished advantageously by introducing the bottle portions into a friction welding or so-called spin welding device 32. In such a spin welding process, the container portions are placed into axial juxtaposition so they contact one another in the final desired configuration, and then the respective portions are rapidly rotated with respect to one another, in order to generate sufficient friction heat to cause the two portions to fuse or weld together. Such processes as well as suitable apparatus for carrying out these processes are disclosed, e.g., in U.S. Pat. Nos. 3,216,874, 3,220,908, 3,297,504, 3,316,135, Re. 29,448, 3,499,068, 3,701,708 and 3,759,770. The disclosures of these patents are hereby incorporated by reference. According to one embodiment of the present invention, a plastic bottle having a configuration such as that illustrated in FIG. 8 results from spin welding together a bottle top half and a bottle bottom half.

Figure 9:
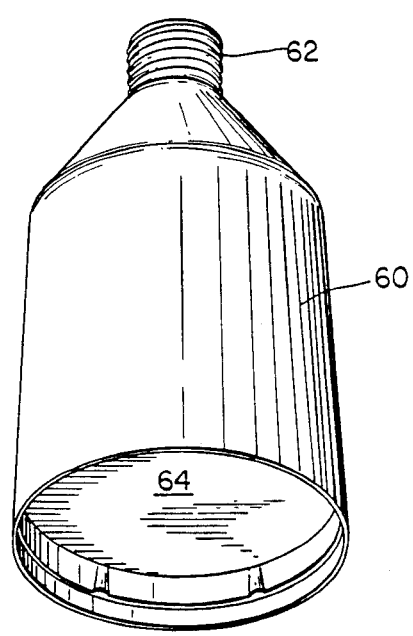
FIG. 9 is a perspective view of another shape of container manufactured according to the process of the present invention.

In accordance with another embodiment of the invention, each of the mold cavities 22 in the blow molding device 16 has the same configuration, which is that of the entire top and sidewall portion of a bottle-like container such as illustrated, for example, in FIG. 9. After exiting from the trimming device 30, these bottles-without-bottoms can be advantageously handled in a number of ways. If they are provided with a suitable bottom-to-top taper, a plurality of these articles can be nested one within the next. In this way the number of empty containers which can be transported in a given volume, e.g., truckload, is multiplied many-fold in comparison to normal empty bottles. In addition, either with or without such a taper, these articles lend themselves excellently to high-speed printing processes, because the hollow article can be slipped over a mandrel to provide adequate support to enable a high-speed printing head to be applied with the force necessary for good quality printing. Either directly after exiting from the trimming apparatus, or after undergoing one or more intermediate processing and/or shipping stages, the hollow bottles-without-bottoms can be subjected to a spin welding step in order to secure a generally planar bottom wall therein. A bottle-like container as illustrated in FIG. 9 is the result.

With reference to FIGS. 2-5, the combined blow molding/biaxial orientation stage taking place within blow molding apparatus 16 will be described in more detail.

Figure 2:
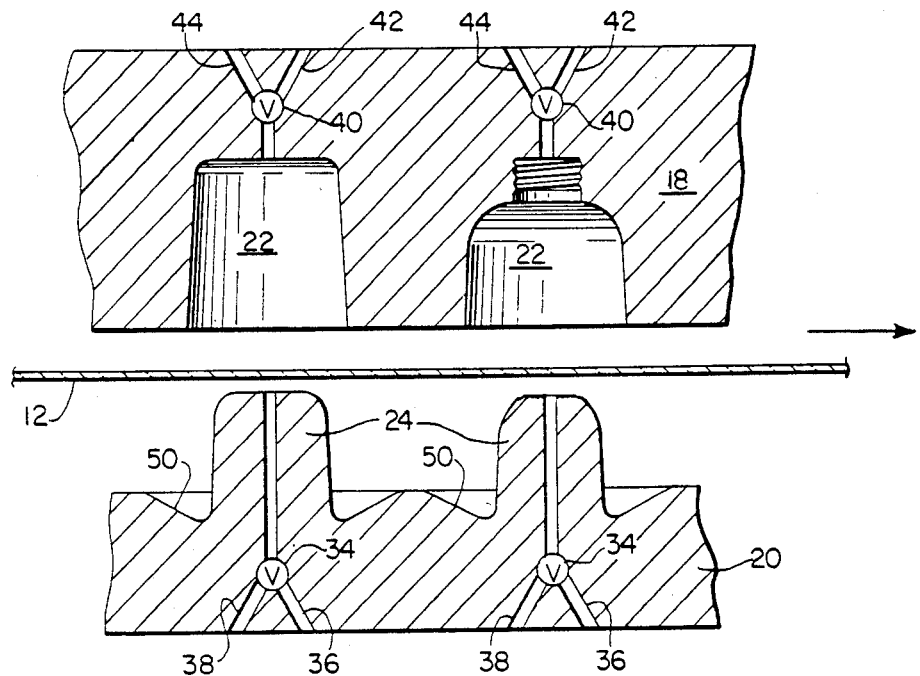
FIGS. 2, 3, 4, and 5 are schematic representations of the orienting/thermoforming steps according to the process of the present invention.

In FIG. 2 sheet 12 is moved into the space between upper mold section 18 and lower mold section 20, the mold sections being spaced apart at this time. Sheet 12 has just left the heater 14 (FIG. 1), which can be a conventional oven, e.g., infrared, of the type associated with blow molding machines. The temperature of the oven will, of course, depend upon the type of thermoplastic material which constitutes sheet 12. In the case of PET sheet material (e.g., 45 mils thick), the oven can be maintained at between about 610°-630° F. The sheet 12 enters the heater and remains therein for several cycles of the machine, as the sheet is stepwise advanced through the heater toward the blow molding machine 16. A satisfactory residence time for PET sheet in the heater at the above temperatures is about 2 minutes. This is sufficient to heat the sheet 12 to a temperature above its softening temperature but below its melting temperature. Suitable temperatures and residence times for other types of sheet material can be readily determined.

Figure 3:
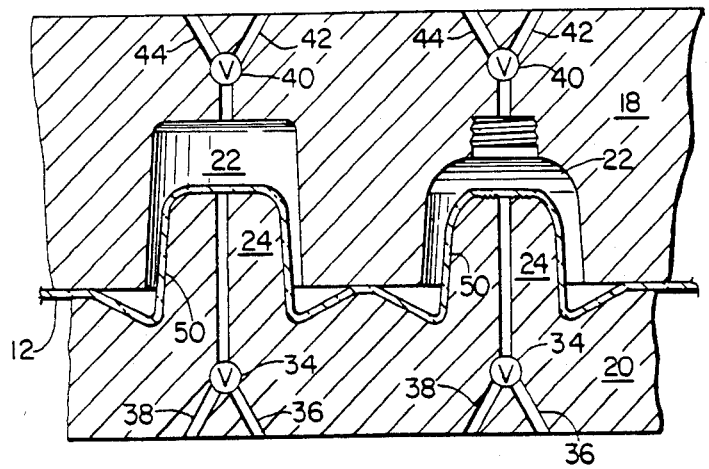

As shown in FIG. 3, the upper and lower mold sections are then closed against one another in order to clamp sheet 12 firmly therebetween. Although not shown in FIG. 3, as the mold sections are closed the sheet 12 is initially displaced upwardly in its center portion by the surface 50 in the lower mold portion 24. This causes the sheet 12 to tent upwardly, so that it contacts only the upper or top portion of surface 50. Three-way valves 34 positioned below each of lower cavities 24 are then actuated to produce communication between the interior of cavity 24 and evacuation line 36, which can be connected to a vacuum source if desired. At the same time, three-way valves 40 are actuated to cause a source of pressurized gas, preferably air, to communicate via lines 44 with the interior of each upper cavity 22. This blows the sheet 12 into contact with the convex surface 50 of the lower mold portions 24.

In FIG. 7, two suitable configurations for surface 50 are illustrated. These configurations are suitable for forming the container portions illustrated in FIGS. 2-6.

The first surface designated by reference numeral 50' takes the form of a shallow concave depression with a centrally located, slightly frustroconical cylinder having a rounded upper edge and a generally flat top projecting upwardly from the bottom of the concave depression. This first surface is especially suited for forming a partially longitudinally oriented thermoplastic pre-form adapted for ultimate fabrication into a biaxially oriented hOllow bottom portion for the bottle illustrated in FIG. 8. The second surface, designated by reference numeral 50" has the form of a shallow concave depression having projecting from the bottom thereof a centrally located, rounded, hemi-ellipsoidal hump with a generally flat central top portion. This second surface is especially suited for forming a partially longitudinally oriented thermoplastic pre-form adapted for ultimate fabrication into a biaxially oriented hollow top portion for the bottle illustrated in FIG. 8. To aid in forming the threaded portion, it is advantageous to provide a series of concentric rings or other surface configuration in the flat central top portion, to hold a sufficient amount of polymer at this location. The shapes of the partially oriented pre-forms are designed to produce a highly uniform wall thickness in each of the top and bottom bottle portions when the respective bottle portions are blow molded to final shape.

The surface 50 of the lower mold portion 24 is at a temperature lower than the temperature of sheet 12 as it exits from heater 14. The temperature of surface 50 is chosen, in combination with the period of time during which the sheet 12 remains in contact with the surface 50, to impart to sheet 12 the optimum temperature for biaxially orienting the sheet during the next stage of the process, which is blowing sheet 12 into upper mold cavity 22. For example, in the case of the PET sheet discussed above, a temperature of about 200° F. for surface 50 is appropriate to bring the material to its orienting temperature with a contact time of between about 0.2 and 0.4 second. Once again, other surface temperatures and contact times can be readily determined.

When sheet 12 is initially blown against the lower mold portion 24, the sheet is at a temperature which is preferably higher than the optimum orientation temperature range for the material, although this is not necessarily the case. At such a higher temperature, the sheet can be blown against surface 50 with a relatively low pressure differential, for example, as low as about 40 psi. Typically, the pressure differential will be at least about 80 psi and may range up to about 200 psi. It is also contemplated that higher pressure, e.g., up to about 350 psi may also be used under certain circumstances, e.g., a larger surface area in surface 50. These latter pressures are, of course, considerably higher than the pressures used in conventional blow molding processes. During the initial blowing stage against lower portion 24, the sheet is typically not biaxially oriented, or at least not to any significant extent. Some orientation will invariably take place, but it is primarily uniaxial in the longitudinal direction.

Figure 4:
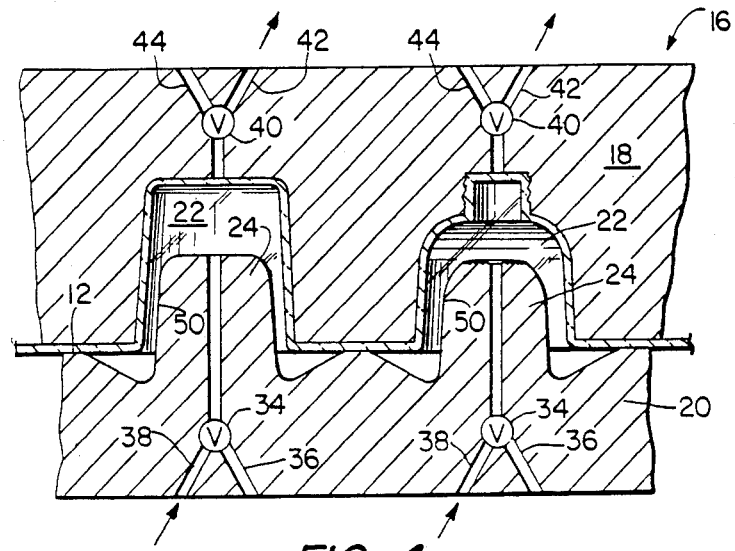

After the sheet 12 has cooled to the desired temperature in contact with surfaces 50, the three-way valves 34 and 40 are actuated to reverse the pressure differential across the sheet. A gas at a very high pressure is introduced into lower cavities 24 via lines 38, as shown in FIG. 4. At the same time the pressure in each upper cavity 22 is exhausted via lines 42, which may optionally also be connected to a vacuum source. It is preferred to use air as the gas, at a pressure of at least 200 psi and up to about 1000 psi. More preferably, the pressure of the air is between about 200 and 650 psi, in view of the fact that the molding equipment must be built quite massively to accommodate the higher pressures. Such massive equipment is not only expensive, but is not well suited to the extremely rapid cycle times which can be achieved by the present process. Very suitable results can be achieved using air pressures of between about 250 and 400 psi.

The pressure differential applied across sheet 12 to force it into mold cavities 22 must be sufficiently high to produce a uniform biaxial orientation of the thermoplastic material. In other words, the blow of the material must be very rapid and complete, i.e., to form a completely shaped container having walls of uniform thickness. Furthermore, the pressure may not be too high, or this uniformity can also be adversely affected. The temperature of the inside surface of mold cavities 22 is simply chosen low enough to rapidly bring the material of sheet 12 below its softening temperature, e.g., below its second order glass transition temperature.

The foregoing temperature and timing considerations are determined to some degree by the overall cycle time for the apparatus. One of the significant advantages of the process according to the invention is that hollow articles can be prepared at very high rates of speed. It is possible, therefore, to operate the process with cycle times as low as about 1.2 seconds, i.e., from the entry of sheet 12 to the exit of the molded product and entry of a new section of sheet 12. Even cycle times as long as 6 seconds are faster than the conventional processes for forming biaxially oriented hollow articles. Typically, the process is operated with cycle times from about 1.5 or 2 seconds up to about 4 seconds.

This means that the contact time between sheet 12 and surfaces 50 of the lower mold cavities 24 is extremely short, e.g., on the order of from about 0.2 to about 0.4 second. However, this is not to say that shorter or longer contact times cannot be used if the appropriate temperatures are chosen for the sheet material and surface 50. There is no advantage to using longer contact times, but rather only the disadvantage of longer cycle times.

Figure 6:
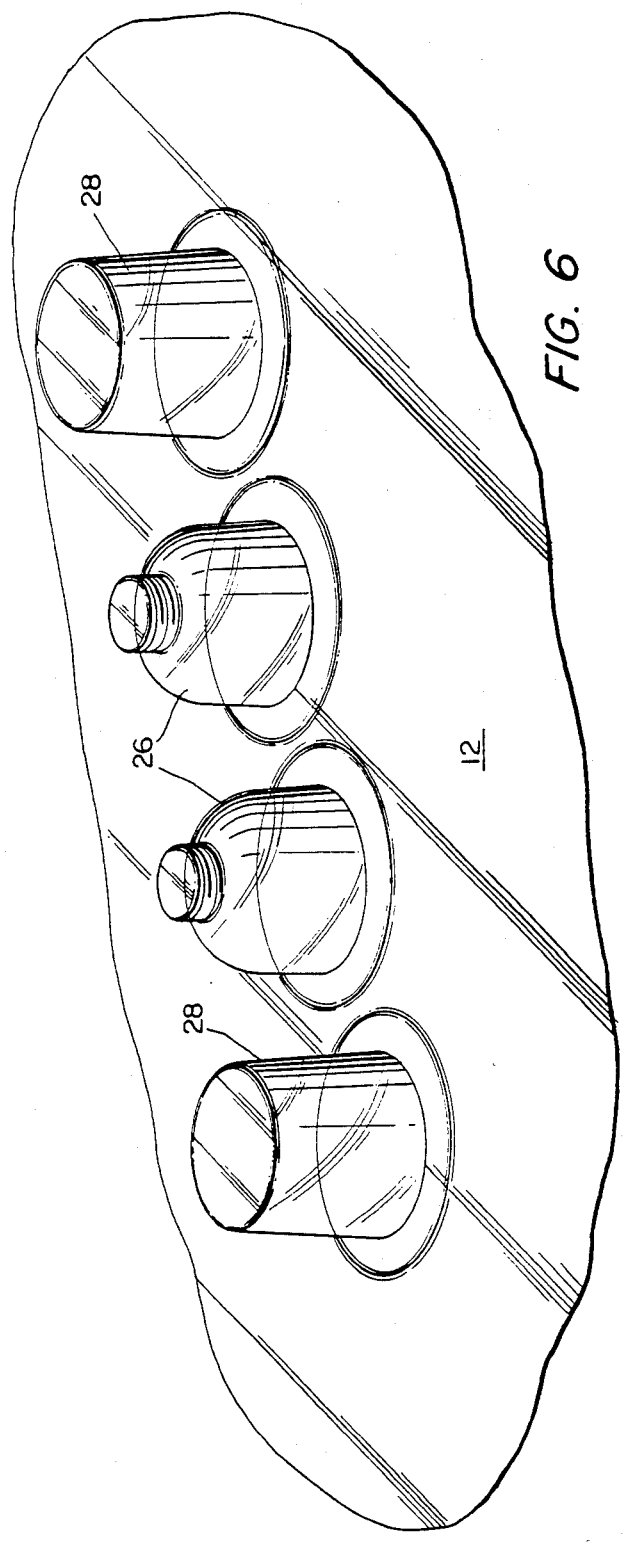
FIG. 6 is a perspective view of a sheet of thermoformed biaxially oriented hollow articles which have been produced according to the process of the present invention and which are not yet separated from one another.
Figure 5:
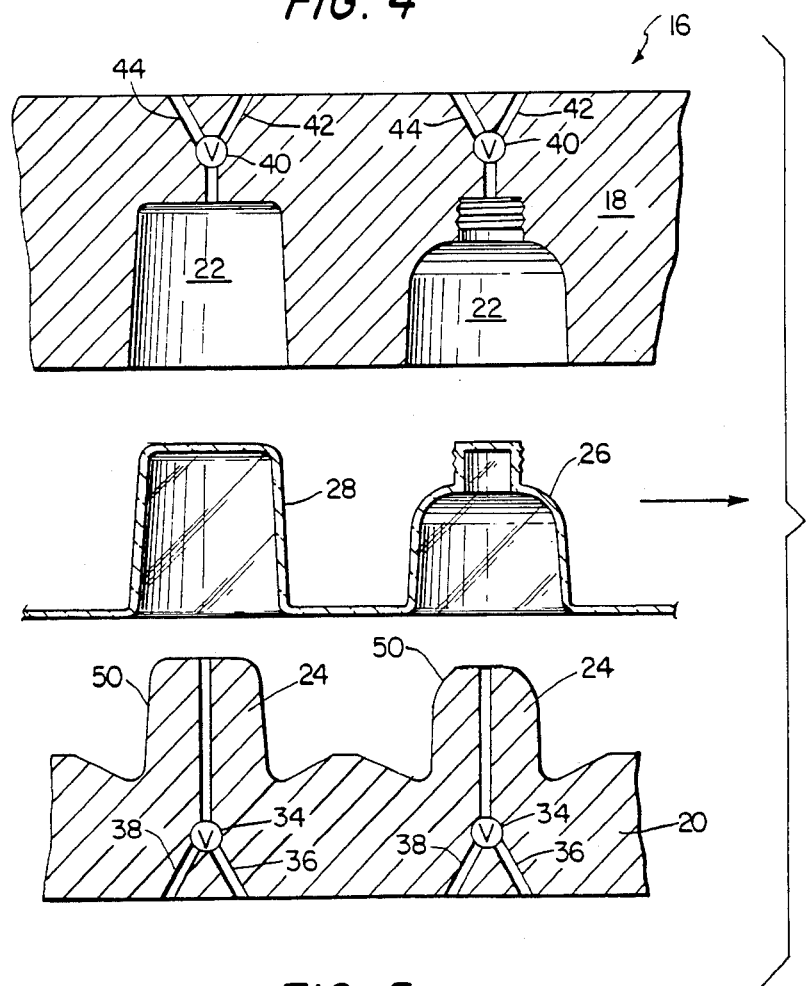

In FIG. 5 is shown the final stage of the blowing process. Upper and lower mold sections 18, 20 are separated apart and the molded sheet 12 containing a plurality of upper bottle portions 26 and a plurality of lower bottle portions 28 is freed from the mold cavities and is transported out of the molding apparatus. A perspective view of a section of molded sheet 12 is illustrated in FIG. 6. A completed bottle having these bottle top and bottom portions spin welded together is illustrated in a perspective view in FIG. 8.

Obviously, the shape of upper mold cavities 22 can be chosen in any desired shape, depending on the shape of the hollow article sought to be produced. An alternative bottle design is shown in perspective in FIG. 9. The entire upper portion 60 of this bottle, included the threaded neck 62 is formed in the blow molding process according to the present invention. Because of the slight upward taper in the walls, the bottomless container portions can be nested with other like articles for shipping and storage. At a subsequent time, the bottom 64 can be added by a spin welding process.

A further advantage of the present invention is that it opens up the possibility of employing specially tailored sheet materials, which can be produced by known sheet extrusion and coextrusion processes. For example, it is possible to employ multilayered co-extruded sheet products which contain at least one layer of a plastic material having good barrier properties, e.g., Saran, polypropylene, high density polyethylene, nitrile-containing polymers, ethylene vinyl alcohol (EVAL) and Barex. The barrier layer can be on one surface of the multi-layer sheet, or sandwiched between other layers of different polymeric materials. For example, it is possible to sandwich a 5 mil layer of EVAL between two layers (25 and 15 mils) of PET. Many other combinations are possible, e.g., polystyrene and high impact polystyrene. These multi-layer sheets can be biaxially oriented without any difficulty by the process of the invention.

It will be appreciated that the figures of drawing illustrating the present invention are merely schematic in many respects which are well understood by those skilled in the art. For example, it is well known that rotatable means must be provided in the vicinity of the threaded neck portion of a molded bottle in order to remove the bottle from the mold cavity upon opening of the mold. Such unthreading means are conventional. Furthermore, the drawings for simplicity illustrate only a single pressurization/exhaust port in each mold half, whereas it is preferable to employ a plurality of such ports positioned at separated locations over the mold cavity surface, for example, ten or more such ports in each mold cavity.

What is claimed is:

1. A process for the production of a hollow article comprised of biaxially oriented thermoplastic resinous material, comprising the steps of:

providing a sheet of a thermoplastic material;

heating said sheet of thermoplastic material to a temperature above the orientation temperature of the thermoplastic material;

clamping an area of the heated thermoplastic sheet between a first mold half and a second mold half by closure of said mold halves, the first mold half containing a pre-form mold surface having a configuration predetermined to provide for a uniform wall thickness of the hollow article to be formed, said surface being at a temperature which is not higher than the orientation temperature of the thermoplastic material, and the second mold half having a cavity which corresponds to the shape of the hollow article to be produced, said clamping mold closure causing the top of said pre-form mold surface to contact the thermoplastic sheet, whereby the sheet is caused to tent into said cavity;

directly after said clamping step, forcing the heated thermoplastic sheet by pressure differential, from said tented configuration into the first mold to instantaneously move it into contact against substantially the entirety of said pre-form mold surface;

maintaining the thermoplastic sheet in contact with said pre-form mold surface for a period of time sufficient to bring the thermoplastic sheet to its orientation temperature; and immediately thereafter forcing the thermoplastic sheet into the second mold half by means of a pressure differential which is sufficient to cause the thermoplastic sheet to conform with the cavity in the second mold half to form a hollow article, with a force sufficient to substantially, molecularly orient the thermoplastic material in both the longitudinal and lateral directions, wherein the process is repeated at a mold cycle time of from about 1.5 to 4 seconds.

2. A process according to claim 1, wherein the thermoplastic material is heated to a temperature slightly above its orientation temperature.

3. A process according to claim 2, wherein the thermoplastic sheet is maintained in contact with said surface for a period of time less than about 1 second.

4. A process according to claim 3, wherein the thermoplastic sheet is maintained in contact with said surface for a period of time less than about 0.5 second.

5. A process according to claim 4, wherein the thermoplastic sheet is maintained in contact with said surface for a period of time between about 0.1 and 0.5 seconds.

6. A process according to claim 5, wherein the thermoplastic sheet is maintained in contact with said surface for a period of time between about 0.2 to 0.4 seconds.

7. A process according to claim 1, wherein the thermoplastic sheet is forced against the first mold half by a pressure differential of from about 40 to 350 psi.

8. A process according to claim 1, wherein the thermoplastic sheets is forced into the second mold half by a pressure differential of from about 200 to 1000 psi.

9. A process according to claim 8, wherein said pressure differential for forcing the thermoplastic sheet into the second mold half is produced by injecting compressed air into the first mold half between said surface and the thermoplastic sheet.

10. A process according to claim 1, wherein the thermoplastic material selected from a polyester, a polyolefin, a polyvinyl aromatic, a nitrile group-containing polymer, an acrylic polymer, a polyamide or a vinyl ester.

11. A process according to claim 1, wherein the thermoplastic sheet is comprised of a plurality of layers of different polymeric material.

12. A process according to claim 11, wherein the thermoplastic sheet comprises at least one layer of polyethylene terephthalate and at least one layer of ethylene vinyl alcohol.

13. A process according to claim 1, wherein a plurality of hollow articles are simultaneously formed from a single thermoplastic sheet.

14. A process according to claim 13, further comprising the step of separating the plurality of hollow articles from one another.

15. A process according to claim 14, wherein at least one of said plurality of hollow articles comprises a container top portion and at least one of said plurality of hollow articles comprises a mating container bottom portion.

16. A process according to claim 15, further comprising the step of uniting said container top portions and said container bottom portion to produce a container.

17. A process according to claim 16, wherein said container comprises a carbonated beverage bottle.

18. A process according to claim 16, wherein said uniting step comprises friction welding the container portions together.

19. A process for the production of a hollow article comprised of a biaxially oriented thermoplastic resinous material, comprising the steps of:

providing a sheet of a thermoplastic material;

heating said sheet of thermoplastic material to a temperature above the orientation temperature of the thermoplastic material;

clamping an area of the heated thermoplastic sheet between a first mold half and a second mold half by closure of said mold halves, the first mold half containing a pre-form mold surface having a configuration predetermined to provide for a uniform wall thickness of the hollow article to be formed, said surface being at a temperature which is not higher than the orientation temperature of the thermoplastic material, and the second mold half having a cavity which corresponds to the shape of the hollow article to be produced, said clamping mold closure bringing said first mold half and said pre-form mold surface into their final molding positions;

directly after said clamping step, forcing the heated thermoplastic sheet by pressure diffenential into the first mold to instantaneously move it into contact against substantially the entirety of said pre-form mold surface;

immediately after said first forcing step maintaining the thermoplastic sheet in contact with said pre-form mold surface for a period of time sufficient to bring the thermoplastic sheet to its orientation temperature; and immediately thereafter forcing the thermoplastic sheet into the second mold half by means of a pressure differential which is sufficient to cause the thermoplastic sheet to conform with the cavity in the second mold half to form a hollow article, with a force sufficient to substantially, molecularly orient the thermoplastic material in both the longitudinal and lateral directions, wherein the process is repeated at a mold cycle time of from about 1.5 to 4 seconds.

20. A process for the production of a hollow article comprised of biaxially oriented thermoplastic resinous material, consisting essentially of the steps of:

providing a sheet of a thermoplastic material;

heating said sheet of thermoplastic material to a temperature above the orientation temperature of the thermoplastic material;

clamping an area of the heated thermoplastic sheet between a first mold half and a second mold half by closure of said mold halves, the first mold half containing a pre-form mold surface having a configuration predetermined to provide for a uniform wall thickness of the hollow article to be formed, said surface being at a temperature which is not higher than the orientation temperature of the thermoplastic material, and the second mold half having a cavity which corresponds to the shape of the hollow article to be produced, said clamping mold closure causing the top of said pre-form mold surface to contact the thermoplastic sheet, whereby the sheet is caused to tent into said cavity;

directly after said clamping step, forcing the heated thermoplastic sheet by pressure differential, from said tented configuration, into the first mold to instantaneously move it into a first position in contact against substantially the entirety of said pre-form mold surface;

immediately after said first forcing step, maintaining the thermoplastic sheet in contact with said pre-form mold surface for a period of time sufficient to bring the thermoplastic sheet to its orientation temperature; and immediately thereafter forcing the thermoplastic sheet from said first position into the second mold half by means of a pressure differential which is sufficient to cause the thermoplastic sheet to conform with the cavity in the second mold half to form a hollow article, with a force sufficient to substantially, molecularly orient the thermoplastic material in both the longitudinal and lateral directions, wherein the process is repeated at a mold cycle time of from about 1.5 to 4 seconds.

* * * * *